(12) United States Patent
Shin et al.

(10) Patent No.: US 12,472,932 B2
(45) Date of Patent: Nov. 18, 2025

(54) HYBRID ELECTRIC VEHICLE AND METHOD FOR CONTROLLING THE SAME

(71) Applicants: Hyundai Motor Company, Seoul (KR); Kia Corporation, Seoul (KR)

(72) Inventors: Hee Jin Shin, Gyeonggi-o (KR); Jeong Woo Park, Gyeonggi-do (KR); Tae Sic Park, Gyeonggi-o (KR); Han Ho Son, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 234 days.

(21) Appl. No.: 17/988,673

(22) Filed: Nov. 16, 2022

(65) Prior Publication Data
US 2023/0398977 A1    Dec. 14, 2023

(30) Foreign Application Priority Data
Jun. 13, 2022   (KR) .................. 10-2022-0071616

(51) Int. Cl.
*B60W 20/20* (2016.01)
*B60K 6/46* (2007.10)

(52) U.S. Cl.
CPC .............. *B60W 20/20* (2013.01); *B60K 6/46* (2013.01); *B60W 2520/10* (2013.01); *B60W 2520/30* (2013.01); *B60W 2540/10* (2013.01); *B60W 2710/06* (2013.01); *B60Y 2200/92* (2013.01)

(58) Field of Classification Search
CPC ............. B60W 20/20; B60W 2520/10; B60W 2520/30; B60W 2540/10; B60W 2710/06; B60W 10/06; B60W 10/08; B60W 2710/083; B60W 20/10; B60W 30/182; B60W 40/105; B60K 6/46; B60K 6/442; B60K 6/44; B60K 6/24; B60K 6/26; B60K 6/48; B60Y 2200/92; Y02T 10/62
USPC .......................................................... 701/22
See application file for complete search history.

(56) References Cited

U.S. PATENT DOCUMENTS

| | | | | |
|---|---|---|---|---|
| 9,868,437 | B2 * | 1/2018 | Iwata | F02B 63/04 |
| 9,896,088 | B2 * | 2/2018 | Miyagawa | B60W 10/08 |
| 11,040,723 | B2 * | 6/2021 | Kim | B60W 50/082 |
| 2013/0123063 | A1 * | 5/2013 | Song | B60K 6/387 |
| | | | | 180/65.265 |
| 2015/0183418 | A1 * | 7/2015 | Shin | B60W 20/19 |
| | | | | 180/65.265 |

* cited by examiner

*Primary Examiner* — Tiffany P Young
*Assistant Examiner* — Leah N Miller
(74) *Attorney, Agent, or Firm* — Fox Rothschild LLP

(57) ABSTRACT

Disclosed is a hybrid electric vehicle comprising an engine configured to generate power by burning a fuel, first and second motor-generators configured to generate power or assist the engine, and a controller. The controller may be configured to set an operation of a first EV mode using the second motor-generator, a second EV mode using the first and second motor-generators, or a series mode of driving the second motor-generator by using power generation of the engine, compare a speed of the vehicle with a reference speed based on that the engine is in an off state, and may be configured to perform a control so that the vehicle drives in the second EV mode when the speed of the vehicle is less than the reference speed.

18 Claims, 18 Drawing Sheets

HYBRID ELECTRIC VEHICLE AND METHOD FOR CONTROLLING THE SAME

CROSS-REFERENCE TO RELATED APPLICATION(S)

This application claims, under 35 U.S.C. § 119(a), the benefit of Korean Patent Application No. 10-2022-0071616, filed in the Korean Intellectual Property Office on Jun. 13, 2022, the disclosure of which is incorporated herein by reference in its entirety.

BACKGROUND

Technical Field

Embodiments of the present disclosure relate to a hybrid electric vehicle and a method for controlling the same, and more particularly, to a technology for reducing a specification of a torque.

Background

A hybrid electric vehicle (HEY) generally refers to a vehicle that uses two power sources together, and the two power sources are mainly an engine and an electric motor. The HEV shows an excellent fuel ratio and shows an excellent power performance and is advantageous in the reduction of exhaust gas as compared with a vehicle provided with only an internal combustion engine. Thus, many HEVs recently have been developed.

Drive modes of HEVs may be classified according to driving of a power transmission system. The drive modes of the HEVs may comprise an electric vehicle (EV) mode, in which only a motor is driven, a series mode, in which an engine and a motor are used, and a parallel mode, in which an output of an engine is transmitted to wheels.

A driving state of an HEY in a wide open throttle (WOT) state may vary according to the drive modes. Accordingly, it is necessary to determine an optimum drive mode such that a ride feeling of a driver is prevented from being lowered while a design specification of a power transmission device is maintained optimally.

SUMMARY

The present disclosure has been made to solve at least the above-mentioned problems occurring in the existing technologies while advantages achieved by the existing technologies are maintained intact.

An aspect of the present disclosure provides a hybrid electric vehicle that may reduce a torque specification of a motor-generator while maintaining a zero-100 performance, and a method for controlling the same.

Another aspect of the present disclosure provides a hybrid electric vehicle that may decrease a size of a system and allow easy designing of a vehicle package by reducing a torque specification of a motor-generator, and a method for controlling the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hybrid electric vehicle comprises an engine configured to generate power by burning a fuel, first and second motor-generators configured to generate power or assist the engine, and a controller. The controller may be configured to set an operation of a first EV mode using the second motor-generator, a second EV mode using the first and second motor-generators, or a series mode of driving the second motor-generator by using power generation of the engine, compare a speed of the vehicle with a reference speed based on that the engine is in an off state, and performs a control so that the vehicle drives in the second EV mode when the speed of the vehicle is less than the reference speed, for example less than at least or up to 1, 2, 3, 4, 5, 6, 7, 8, 9, 10, 15 or 20 percent than the reference speed.

According to an exemplary embodiment of the present disclosure, the reference speed may be set such that a 0-100 performance in the first EV mode and a 0-100 performance in the second EV mode are the same.

According to an exemplary embodiment of the present disclosure, the reference speed may be set based on a first vehicle speed-wheel torque graph in a process of converting the first EV mode to the series mode, and a second vehicle speed-wheel torque graph in a process of converting the second EV mode to the series mode, and a magnitude of a wheel torque in the second EV mode may be set such that a wheel torque area of the second vehicle speed-wheel torque graph, which is increased as compared with the first vehicle speed-wheel torque graph during a period, in which the vehicle drives at a speed before the reference speed, and a wheel-torque area of the second vehicle speed-wheel torque graph, which is decreased as compared with the first vehicle speed-wheel torque graph during a specific period, in which the vehicle drives at more than the reference speed are the same.

According to an exemplary embodiment of the present disclosure, outputs of wheel torque decreasing area in the series mode may be the same in the first vehicle speed-wheel torque graph and the second vehicle speed-wheel torque graph.

According to an exemplary embodiment of the present disclosure, the reference speed may be set such that a power-down of wheel power is within a preset threshold electric power.

According to an exemplary embodiment of the present disclosure, the controller may be configured to identify a request for a wide open throttle (WOT) state when an accelerator pedal signal of the vehicle is a threshold value or more while driving in the second EV mode.

According to an exemplary embodiment of the present disclosure, the controller may be configured to determine whether the engine is in the off state again in response to the request for the WOT state, and may be configured to select the series mode when the engine of the vehicle is in an on state.

According to an exemplary embodiment of the present disclosure, the controller may be configured to maintain a driving mode, in which the vehicle is driving, when the accelerator pedal signal of the vehicle is less than the threshold value.

According to an exemplary embodiment of the present disclosure, the controller may be configured to switch on the engine when the speed of the vehicle is the reference speed or more while the engine of the vehicle is in the off state.

According to an exemplary embodiment of the present disclosure, the controller may be configured to set an operation in the series mode after the engine is switched on.

According to another aspect of the present disclosure, a method for controlling a hybrid electric vehicle comprising an engine, and first and second motor-generators, wherein a power transmission device is controlled in one selected from a first EV mode using the second motor-generator, a second EV mode using the first and second motor-generators, or a series mode of driving the second motor-generator by using power generation of the engine, is provided. The method may comprise determining whether the engine of the vehicle is in an off state, by a controller, comparing a speed of the vehicle with a reference speed, when the engine of the vehicle is in the off state, by the controller, and selecting the second EV mode, when the speed of the vehicle is less than the reference speed, by the controller.

According to an exemplary embodiment of the present disclosure, the reference speed may be set such that a 0-100 performance in the first EV mode and a zero-100 performance in the second EV mode are the same.

According to an exemplary embodiment of the present disclosure, the reference speed may be set based on a first vehicle speed-wheel torque graph in a process of converting the first EV mode to the series mode, and a second vehicle speed-wheel torque graph in a process of converting the second EV mode to the series mode, and a magnitude of a wheel torque in the second EV mode may be set such that a wheel torque area of the second vehicle speed-wheel torque graph, which is increased as compared with the first vehicle speed-wheel torque graph during a period, in which the vehicle drives at a speed before the reference speed, and a wheel-torque area of the second vehicle speed-wheel torque graph, which is decreased as compared with the first vehicle speed-wheel torque graph during a specific period, in which the vehicle drives at more than the reference speed are the same.

According to an exemplary embodiment of the present disclosure, outputs of wheel torque decreasing area in the series mode may be the same in the first vehicle speed-wheel torque graph and the second vehicle speed-wheel torque graph.

According to an exemplary embodiment of the present disclosure, the reference speed may be set such that a power-down of wheel power is within a preset threshold electric power.

According to an exemplary embodiment of the present disclosure, the method may further comprise, after performing a control such that the vehicle drives in the second EV mode, identifying a request for a WOT state when an accelerator pedal signal of the vehicle is a threshold value or more, by the controller.

According to an exemplary embodiment of the present disclosure, the method may further comprise determining whether the engine is an off state in response to the request for the wide open throttle state, by the controller, and selecting the series mode when the engine of the vehicle is in an on state, by the controller.

According to an exemplary embodiment of the present disclosure, the method may further comprise maintaining a driving mode, in which the vehicle is driving, when the accelerator pedal signal of the vehicle is less than the threshold value, by the controller.

According to an exemplary embodiment of the present disclosure, the method may further comprise switching on the engine when the speed of the vehicle is the reference speed or more while the engine of the vehicle is in the off state, by the controller.

According to an exemplary embodiment of the present disclosure, the switching on the engine may comprise setting a drive in the series mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
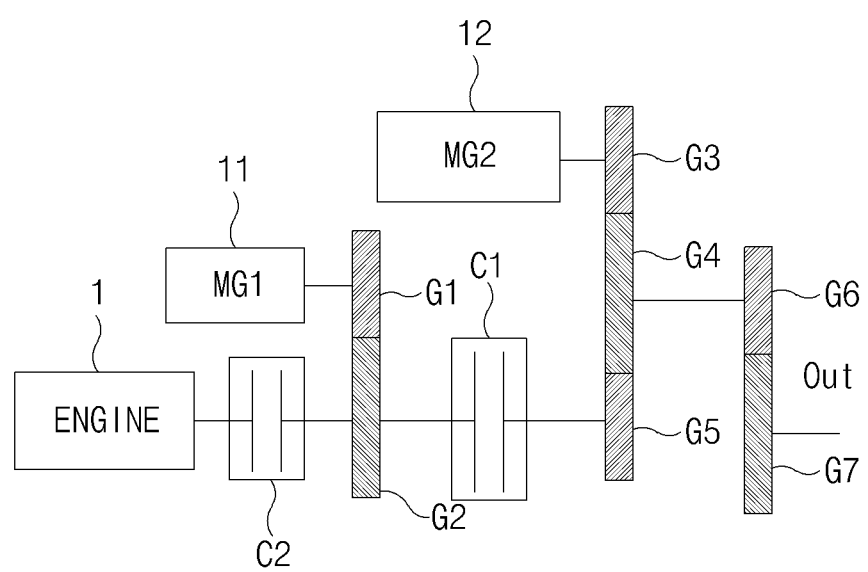
FIG. 1 is a view illustrating a configuration of a power transmission device of a hybrid electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 18.

FIG. 1 is a view illustrating a configuration of a power transmission device of a hybrid electric vehicle according to an exemplary embodiment of the present disclosure.

Referring to FIG. 1, a power transmission device of a hybrid electric vehicle according to an exemplary embodiment of the present disclosure may comprise an engine 1, first and second motor-generators 11 and 12, first and second clutches C1 and C2, and a plurality of gears G1 to G7.

The engine 1 may be configured to generate power by burning a fuel. Furthermore, the engine 1 may be configured to be operated as a power generator to generate electric energy.

The first and second motor-generators 11 and 12 may be configured to be operated as power generators or assist the engine 1. That is, the first and second motor-generators 11 and 12 may be configured to perform a function of a power generator during regenerative braking, or may be configured to perform a function of driving a vehicle during a general drive.

Driving of the first and second motor-generators 11 and 12 is controlled selectively, and thus, a first EV mode, a second EV mode, a series mode, or a parallel mode may be determined.

An EV mode is a mode, in which electric power of a battery is supplied to the first and second motor-generators 11 and 12 in a state, in which the engine 1 is stopped, and the vehicle is driven by power of the first and second motor-generators 11 and 12. The EV mode may significantly influence enhancement of fuel efficiency because the engine is stopped, the vehicle may be configured to drive rearwards without using a separate backward gear device, and the EV mode may be operated when the vehicle starts and drive at a low speed after the vehicle is stopped. The EV mode may be classified into the first EV mode and the second EV mode. Only the second motor-generator 12 may be driven in the first EV mode, and power from the second motor-generator 12 may be output through third to seventh gears G3 to G7.

The first and second motor-generators 11 and 12 may be driven in the second EV mode, and power may be output by using the first to seventh gears G1 to G7.

The series mode may be an operation mode, in which the engine 1 may be driven and the engine 1 may be configured to generate power by using the first motor-generator 11. Electric energy generated by the engine 1 in the series mode may be used as power that drives the second motor-generator 12.

The parallel mode may be a mode, in which power generated by driving the engine 1 is output through gears.

A first clutch C1 may be configured to determine whether a second gear G2 and a fifth gear G5 are connected to each other, and a second clutch C2 may be configured to determine whether the engine 1 and the second gear G2 are connected to each other. A power transmission device according to an exemplary embodiment of the present disclosure may be configured to interrupt connection of the engine 1 and the second gear G2 by using the second clutch C2, and thus the second EV mode may be used.

Figure 2:
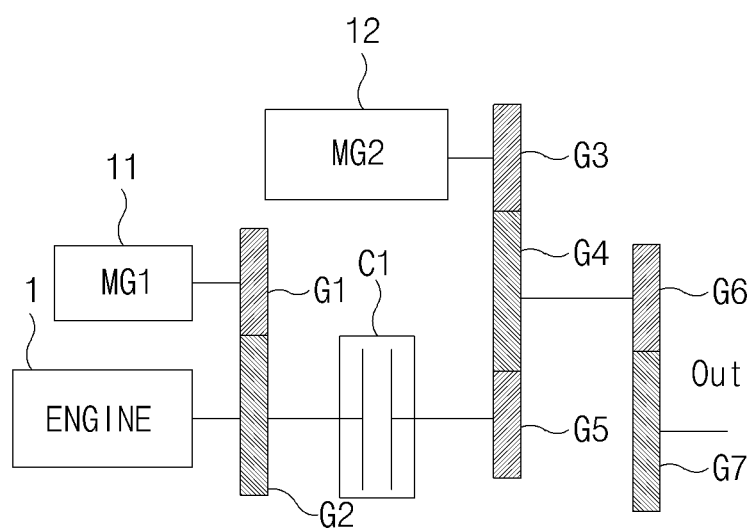
FIG. 2 is a view illustrating a power transmission device according to a comparative example.

FIG. 2 is a view illustrating the power transmission device according to a comparative example.

The power transmission device illustrated in FIG. 2 may be configured to transmit power to the engine 1 when the first motor-generator 11 is driven because the engine 1 and the second gear G2 are always connected to each other. Accordingly, an operation of the second EV mode, in which the driving of the engine 1 has to be limited, is impossible because but the power transmission device illustrated in FIG. 1 may be configured to allow an operation of the second EV mode by using the second clutch C2.

Figure 3:
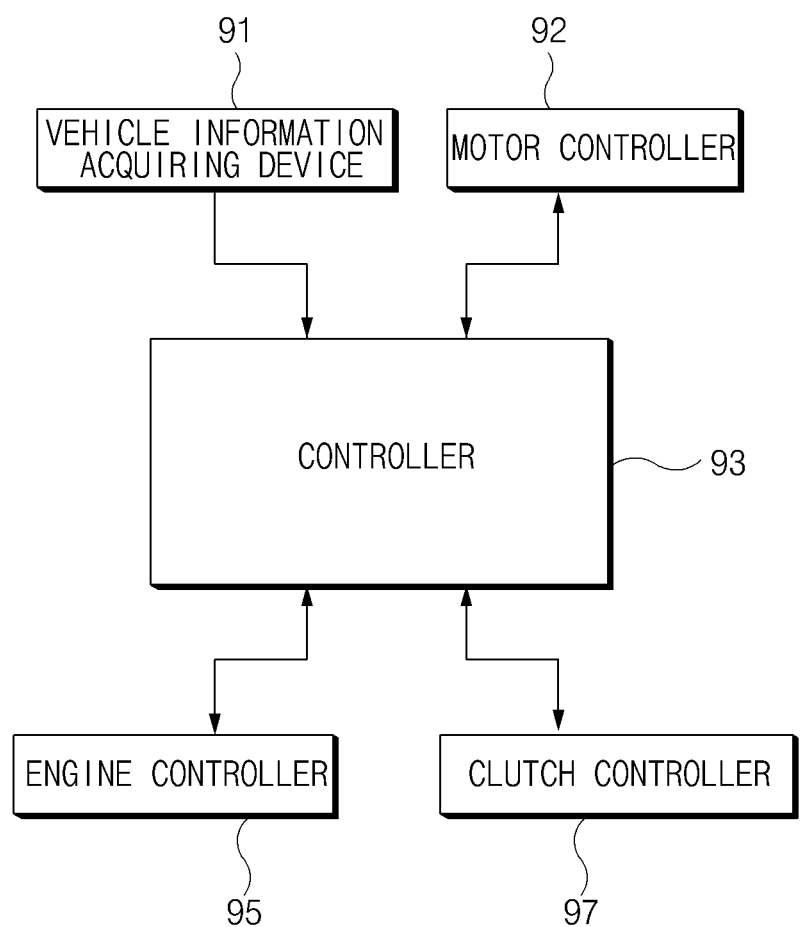
FIG. 3 is a block diagram illustrating a configuration of an apparatus for controlling a hybrid electric vehicle according to an exemplary embodiment of the present disclosure.

FIG. 3 is a block diagram illustrating a configuration of an apparatus for controlling a hybrid electric vehicle according to an exemplary embodiment of the present disclosure. Then, the apparatus for controlling the hybrid electric vehicle illustrated in FIG. 3 may be integrally formed with control units in the interior of the vehicle, or may be embodied as a separate apparatus to be connected to the control units of the vehicle by a separate connection unit.

Referring to FIG. 3, the apparatus for controlling a hybrid electric vehicle according to an exemplary embodiment of the present disclosure may comprise a vehicle information acquiring device 91, a motor controller 92, an engine controller 95, a clutch controller 97, and a controller 93.

The vehicle information acquiring device 91 may be configured to acquire a speed of the vehicle and an accelerator pedal signal. The accelerator pedal signal may be a signal acquired by an accelerator position sensor (APS), and may be expressed by a magnitude that is proportional to a pushing degree of the accelerator pedal. The accelerator pedal signal may be classified into 0 (zero) to 100. A state, in which the accelerator pedal is 0, may mean a momentum drive or a braking state, and a state, in which the accelerator pedal signal is 100, may mean that required power is in a wide open throttle (WOT) state.

The motor controller 92 may be configured to acquire rpms and torques of the first and second motor-generators 11 and 12, and may be configured to provide them to the controller 93.

The engine controller 95 may be configured to acquire an rpm and a torque of the engine 1, and may be configured to provide them to the controller 93.

The clutch controller 97 may be configured to provide information on states of the first and second clutches C1 and C2 to the controller 93.

The controller 93 may comprise one or more processors that are operated by a preset program, and the preset program may be configured to perform operations of the method for controlling the hybrid electric vehicle according to an exemplary embodiment of the present disclosure.

The controller 93 may be configured to control the power transmission device by setting an operation of the first EV mode, the second EV mode, the series mode, or the parallel mode.

The controller 93 may be configured to determine whether the speed of the vehicle is a reference speed based on that the engine 1 is in an off state, and may be configured to perform a control such that the vehicle drives in the second EV mode based on that the speed of the vehicle is less than the reference speed. The reference speed may be set such that a zero-100 performance in the first EV mode and a zero-100 performance in the second EV mode are the same. A scheme of setting the reference speed will be described below with reference to FIGS. 5 to 7.

Figure 4:
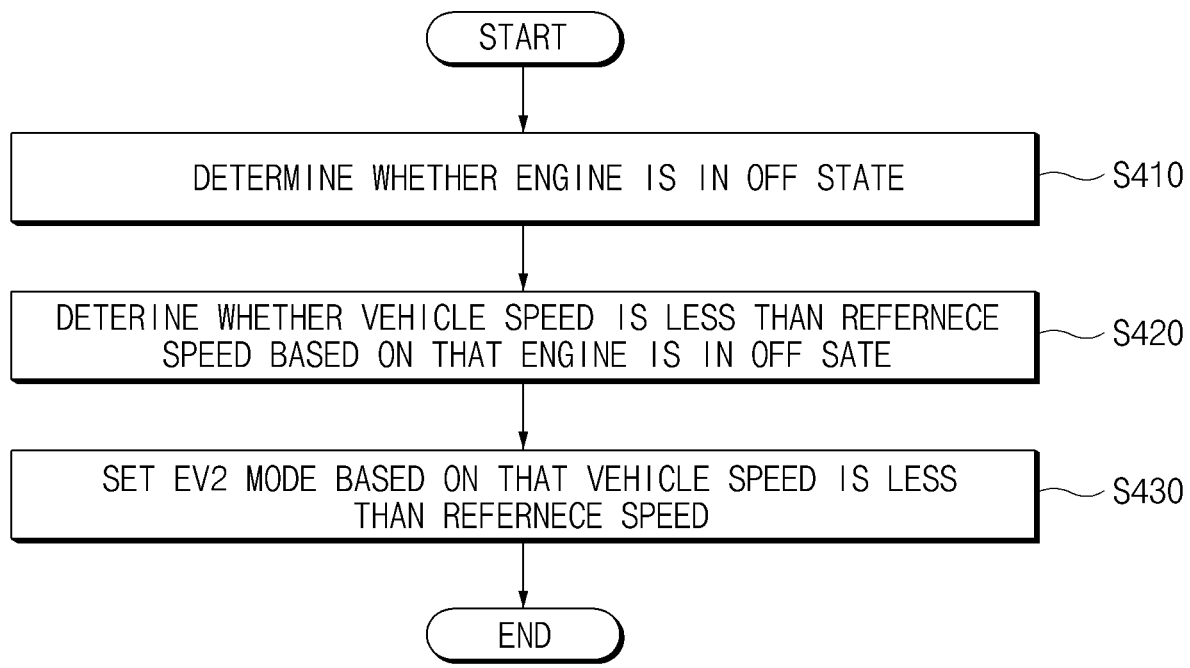
FIG. 4 is a flowchart illustrating a method for controlling a hybrid electric vehicle according to an exemplary embodiment of the present disclosure.

Hereinafter, the method for controlling the hybrid electric vehicle according to an exemplary embodiment of the present disclosure will be described in detail with reference to FIG. 4. FIG. 4 is a flowchart illustrating the method for controlling the hybrid electric vehicle according to an exemplary embodiment of the present disclosure.

Referring to FIG. 4, in S410, the controller 93 may be configured to determine whether the engine 1 is in an off state.

According to an exemplary embodiment, the controller 93 may be configured to determine whether the engine is in an off state, based on information on the engine from the engine controller 95. For example, the controller 93 may be configured to determine whether the engine 1 is in an off state, based on an rpm of the engine and a torque of the engine.

A procedure of determining whether the engine 1 is in an off state may be a procedure of determining whether the vehicle drives in the EV mode. The controller 93 may be configured to determine that the vehicle is driving in the EV mode based on that the engine 1 is in an off state, and may be configured to proceed to a following procedure.

In S420, the controller 93 may be configured to determine whether the speed of the vehicle is less than the reference speed, based on that the engine is in an off state.

The reference speed is a preset value. The reference speed may be set in consideration of the zero-100 performance, reduction of the torque of the second motor-generator 12, a specification of the battery, and the like. A detailed description of a setting condition of the reference speed will be described below.

In S430, the controller 93 may set a driving mode of the vehicle to the second EV mode (EV2) based on that the speed of the vehicle is less than the reference speed.

The vehicle may be configured to drive in the second EV mode (EV2) when the controller 93 determines that the engine 1 is in an off state and the speed of the vehicle is less than the reference speed.

By procedure S430, the vehicle may be configured to drive in the second EV mode (EV2) when the controller 93 determines that the engine 1 is in an off state and the speed of the vehicle is less than the reference speed. When the vehicle drives in the second EV mode (EV2), a torque specification of the second motor-generator 12 may be reduced while the vehicle drives in the series mode using the engine 1 later. This will be described in more detail as follows.

Figure 5:
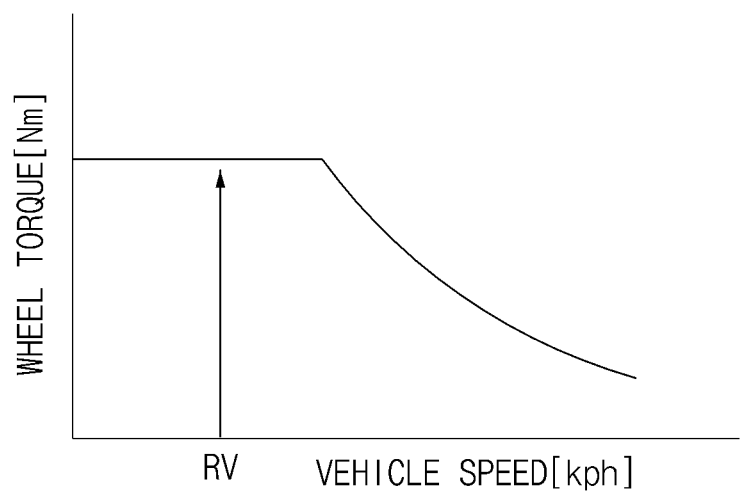
FIG. 5 is a view illustrating a change in a wheel torque in a first EV mode.

FIG. 5 is a view illustrating a change in a wheel torque in the first EV mode. In particular, FIG. 5 illustrates a graph depicting a first vehicle speed-wheel torque relationship in a process of converting the first EV mode to the series mode.

Referring to FIG. 5, the vehicle speed may become higher in proportion to an accelerator pedal signal that indicates that the vehicle drives in the first EV mode (EV1). The controller 93 may be configured to convert the drive mode of the vehicle to the series mode when the accelerator pedal signal requires a reference speed RV or higher. When the drive mode is converted to the series mode in the first EV mode (EV1), the wheel torque may be maintained constantly during a specific time period after the mode is changed at the reference speed RV.

Figure 6:
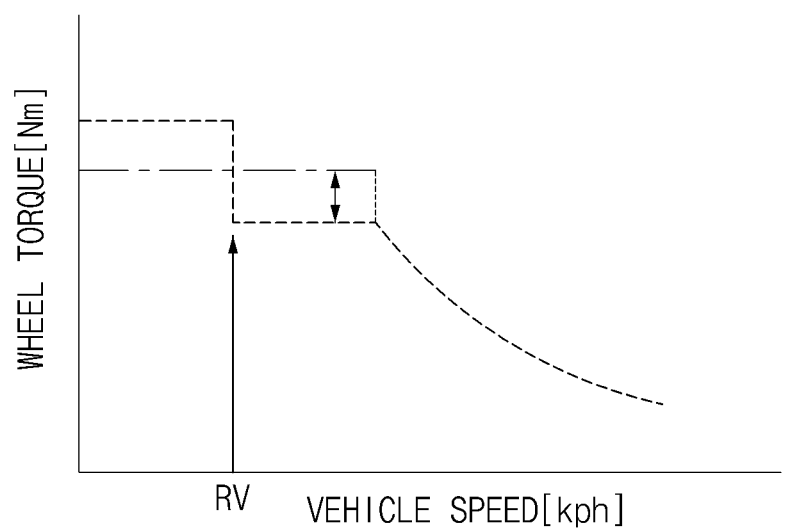
FIG. 6 is a view illustrating a change in a wheel torque in a second EV mode.

FIG. 6 is a view illustrating a change in a wheel torque in the second EV mode. In particular, FIG. 6 illustrates a graph depicting a second vehicle speed-wheel torque relationship in a process of converting the second EV mode to the series mode.

Referring to FIG. 6, the vehicle speed may become higher in proportion to an accelerator pedal signal that indicates that the vehicle drives in the second EV mode (EV2). The controller 93 may be configured to convert the drive mode of the vehicle to the series mode when the accelerator pedal signal requires a reference speed RV or higher. When the drive mode is converted from the second EV mode (EV2) to the series mode, the wheel torque may be reduced at a timing, at which the mode is changed.

Figure 7:
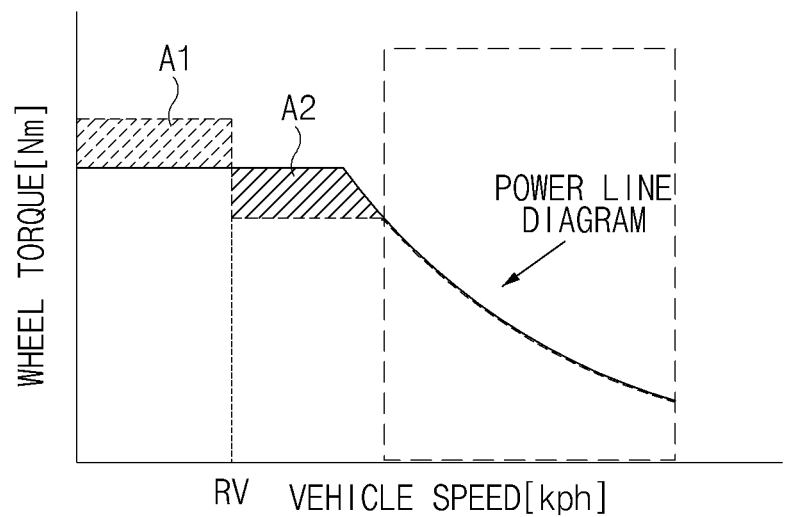
FIG. 7 is a view for comparing a change in a wheel torque in a series mode drive process in a first EV mode and a change in a wheel torque in a series mode in a second EV mode.

FIG. 7 is a view for comparing a change in a wheel torque in the series mode drive process in the first EV mode and a change in a wheel torque in the series mode in the second EV mode.

Referring to FIG. 7, a first area A1 may refer to a wheel-torque area of a second vehicle speed-wheel torque graph, which is increased as compared with a first vehicle speed-wheel torque graph. The first area A1 may be a wheel torque increasing area in a time period, in which the vehicle drives at a speed of the reference speed RV or less.

A second area A2 may refer to a wheel-torque area of the second vehicle speed-wheel torque graph, which is decreased as compared with the first vehicle speed-wheel torque graph. The second area A2 may be a wheel torque decreasing area in a time period, in which the vehicle drives at a speed of more than the reference speed RV.

When sizes of the first area A1 and the second area A2 are the same, zero-100 performances thereof may be maintained at the same value. That is, when the sizes of the first area A1 and the second area A2 are the same, the zero-100 performance when the first EV mode (EV1) is changed to the series mode and the zero-100 performance when the second EV mode (EV2) is changed to the series mode may be the same level. To maintain the zero-100 performance when the second EV mode (EV2) is changed to the series mode, the sizes of the first area A1 and the second area A2 may be set to be the same. An initial wheel torque in the second EV mode (EV2) may be set such that the sizes of the first area A1 and the second area A2 are set to be the same. The initial wheel torque may refer to a magnitude of the wheel torque in the second EV mode (EV2) when the speed of the vehicle is less than the reference speed RV.

Furthermore, in the first vehicle speed-wheel torque graph and the second vehicle speed-wheel torque graph, the outputs of the wheel torque decreasing areas are set to be the same in the series mode, whereby compatibilities of configurations of the power transmission device, such as an inverter, the first motor-generator 11, the battery, and the like, may be increased.

Figure 8:
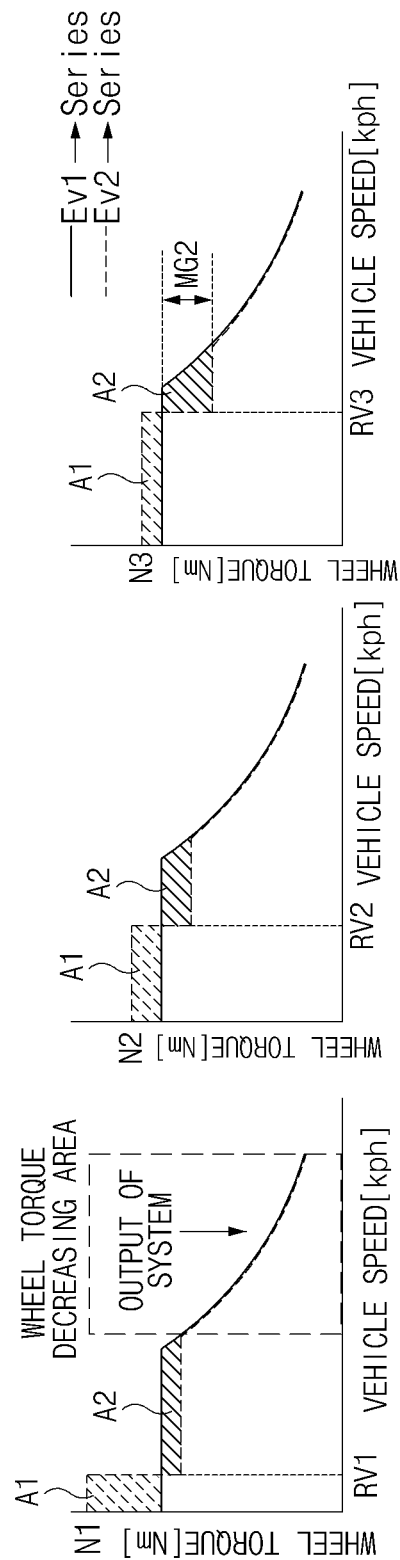
FIG. 8 is a view illustrating an exemplary embodiment of setting a reference speed and an initial wheel torque.

FIG. 8 is a view illustrating an exemplary embodiment of setting the reference speed and the initial wheel torque.

Referring to FIG. 8, a magnitude of the initial wheel torque may be changed according to the reference speed RV.

When the reference speed RV is a first speed RV1, the initial wheel torque may be set to a first wheel torque N1. When the reference speed RV is a second speed RV2 that is higher than the first speed RV1, the initial wheel torque may be set to a second wheel torque N2 that is lower than the first wheel torque N1. When the reference speed RV is a third speed RV3 that is higher than the second speed RV2, the initial wheel torque may be set to a third wheel torque N3 that is lower than the second wheel torque N2.

In this way, when the reference speed RV is set to be a high value, the initial wheel torque may be set to a low value. Because a design specification required by a system becomes lower as the initial wheel torque becomes lower, it may be advantageous in manufacturing.

Furthermore, when the initial wheel torque is low, a reduction of the wheel torque according to a reduction of the torque of the second motor-generator 12 after conversion to the series mode may be increased. Because a design specification required by a system becomes lower as the reduction of the wheel torque becomes smaller, it may be advantageous in manufacturing.

Accordingly, to make the initial wheel torque high and make the reduction of the wheel torque small, the magnitude of the reference speed RV may be set to be large.

However, when the magnitude of the reference speed RV increases, a power-down phenomenon may occur. Accordingly, the reference speed RV may be set in a range, in which the power-down is less than threshold power.

Figure 9:
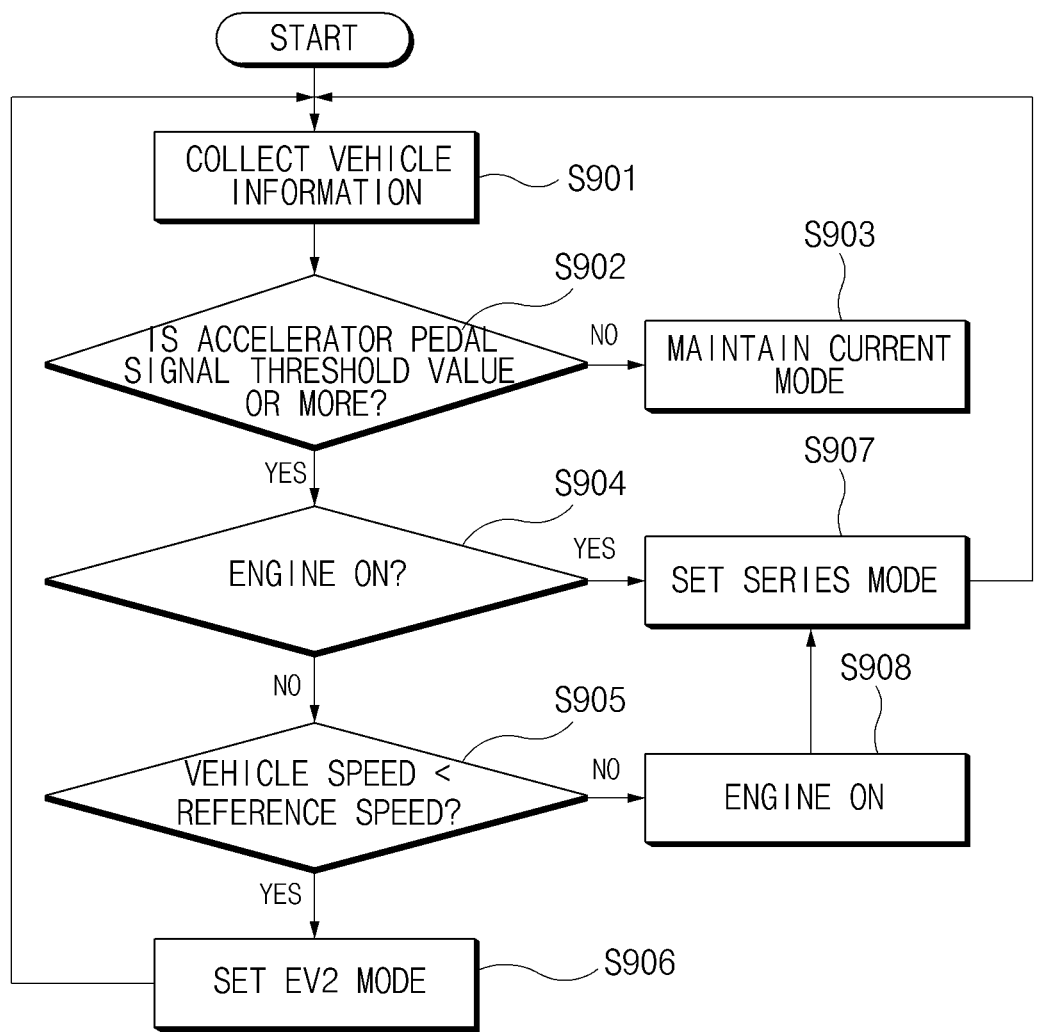
FIG. 9 is a flowchart illustrating a method for controlling a hybrid electric vehicle according to another embodiment of the present disclosure.

FIG. 9 is a flowchart illustrating a method for controlling a hybrid electric vehicle according to another embodiment of the present disclosure. Referring to FIG. 9, a method for controlling the hybrid vehicle according to another embodiment of the present disclosure will be described as follows.

In S901, the controller 93 may be configured to collect vehicle information. According to an exemplary embodiment, the controller 93 may be configured to receive an accelerator pedal signal from the vehicle information acquiring device 91.

In S902, the controller 93 may be configured to determine whether the accelerator pedal signal is a threshold value or more. The threshold value may be set to a size, by which required power is a wide open throttle state or a level that is close to the wide open throttle state. Accordingly, the threshold value may be set to a value that is close to 100, for example, a value of around 95.

In S903, when the accelerator pedal signal is less than the threshold value, the controller 93 may be configured to maintain a driving mode during drive thereof. That is, the driving mode selected from the first EV mode, the second EV mode, the series mode, or the parallel mode may be maintained.

In S904, the controller 93 may be configured to determine whether the engine is in an on state when the accelerator pedal signal is the threshold value or more.

In S905, when the engine 1 is in an off state, the controller 93 may be configured to determine whether the speed of the vehicle is less than the reference speed.

In S906, when the speed of the vehicle is less than the reference speed, the controller 93 may be configured to select the second EV mode (EV2), and may be configured to control the power transmission device based on the second EV mode (EV2).

After procedure S906, the controller 93 may be configured to enter into S901 again.

Through procedures S901, S902, S904, S905, and S906, the controller 93 may be configured to select the second EV mode (EV2) in a situation that is required in the EV mode. Accordingly, a state, in which procedure S904 proceeds to procedure S907, may be a procedure for conversion to the series mode in the second EV mode (EV2). That is, the controller 93 may be configured to change the mode of the power transmission device from the second EV mode (EV2) to the series mode when the engine 1 is in the on state while the accelerator pedal signal is the threshold value or more.

Furthermore, the controller 93 may be configured to enter into procedure S908 from S905 when the speed of the vehicle is the reference speed or more, and may be configured to switch on the engine 1.

Subsequently, the controller 93 may be configured to enter into procedure S907 from S908, and may be configured to change the mode of the power transmission device from the second EV mode (EV2) to the series mode.

As discussed above, according to an exemplary embodiment of the present disclosure, a specification of the torque of the second motor-generator 12 may be reduced while a zero-100 performance of the same level as when the first EV mode (EV1) is used is maintained. Because the specification of the torque of the second motor-generator 12 is reduced, the size of the system may be decreased, and a package of the vehicle may be easily designed.

FIGS. 10 to 13 are views illustrating drive analysis data according to an exemplary embodiment of the present disclosure. FIGS. 10 to 13 are views illustrating a simulation result of an exemplary embodiment, in which the reference speed is set to the first speed RV1 in FIG. 8.

In FIGS. 10 to 13, a first graph (Base) depicts a simulation result of a change from the first EV mode (EV1) to the series mode, and a second graph (2Motor) is a graph that depicts a simulation result of a change from the second EV mode (EV2) to the series mode.

Figure 10:
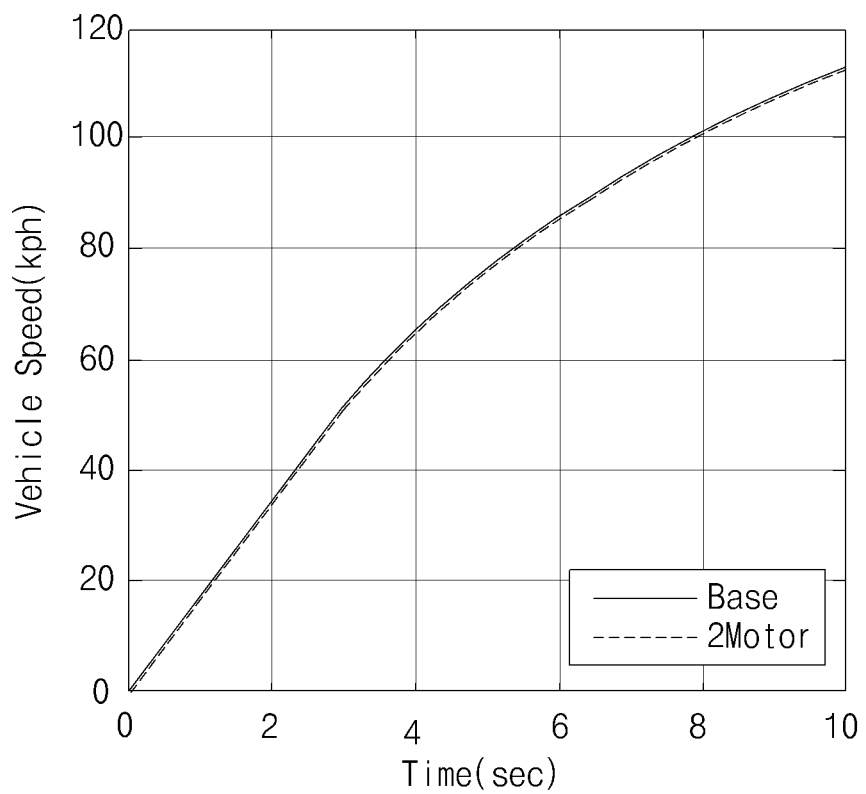
FIGS. 10 to 17 are views illustrating drive analysis data according to an exemplary embodiment of the present disclosure.

FIG. 10 is a graph that depicts the speed of the vehicle according to time in the wide open throttle state. That is, FIG. 10 is a graph for comparing zero-100 performances in a change from the first EV mode to the series mode and a change from the second EV mode to the series mode.

Referring to FIG. 10, it may be seen that the zero-100 in a first EV mode operation state and the zero-100 in a second EV mode operation state are of the same level.

Figure 11:
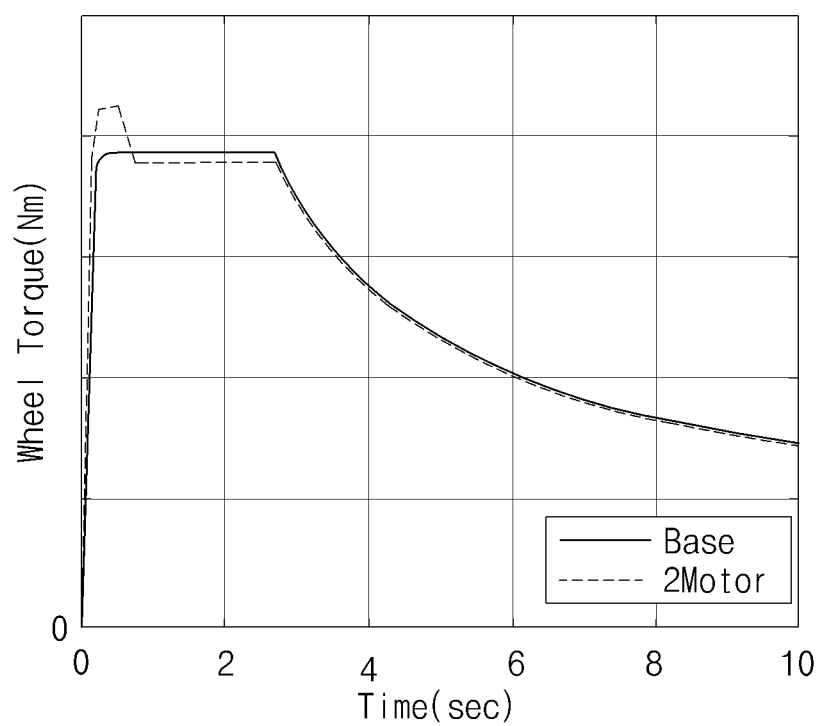
Figure 12:
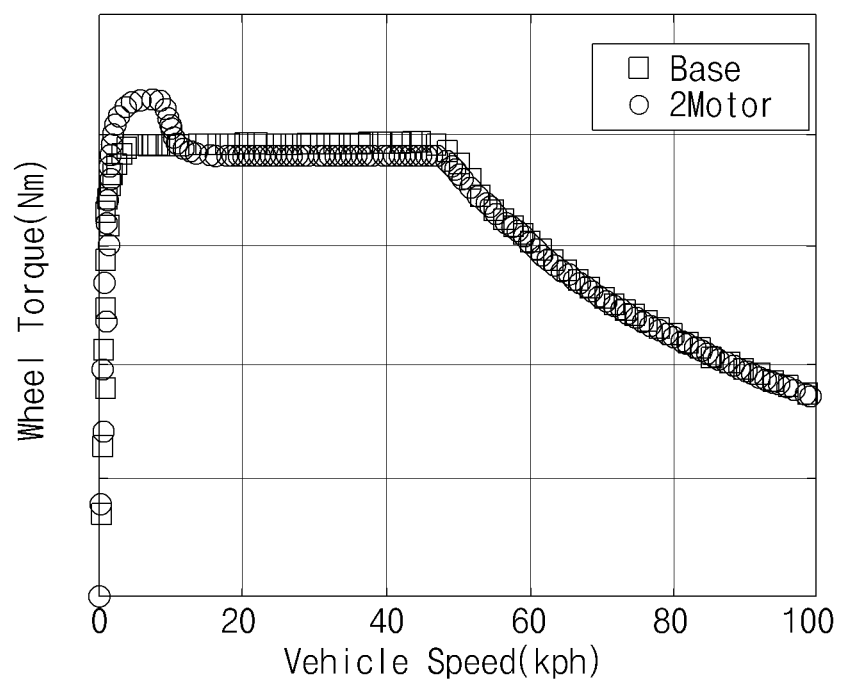

FIG. 11 is a graph depicting a change in the wheel torque according to time, and FIG. 12 is a graph depicting the wheel torque according to the speed of the vehicle.

Referring to FIGS. 11 and 12, it may be seen that changes in the wheel torques in the first graph (Base) and the second graph (2Motor) are different.

Figure 13:
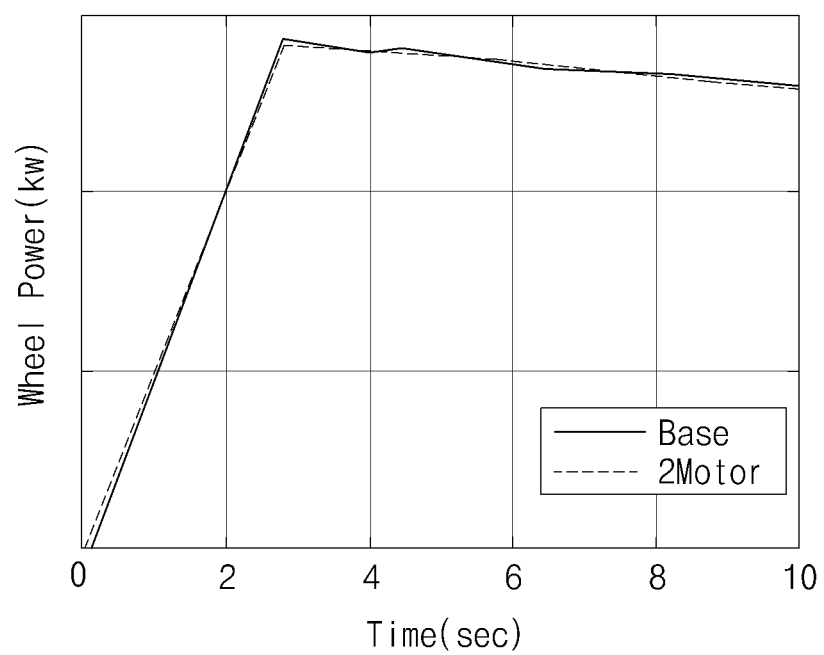

FIG. 13 is a graph that depicting a wheel power according to time.

Referring to FIG. 13, it may be seen that a section, in which a decrease in the wheel power abruptly occurs according to a change in time does not occur, is not generated when the reference speed is relatively low. That is, when the reference speed is set to be low, the power-down of the wheel power may not occur.

FIGS. 14 to 17 are views illustrating drive analysis data according to an exemplary embodiment of the present disclosure. FIGS. 14 to 17 are views illustrating a simulation result of an exemplary embodiment, in which the reference speed is set to the third speed RV3 in FIG. 8.

In FIGS. 14 to 17, a first graph (Base) depicts a simulation result of a change from the first EV mode (EV1) to the series mode, and a second graph (2Motor) is a graph that depicts a simulation result of a change from the second EV mode (EV2) to the series mode.

Figure 14:
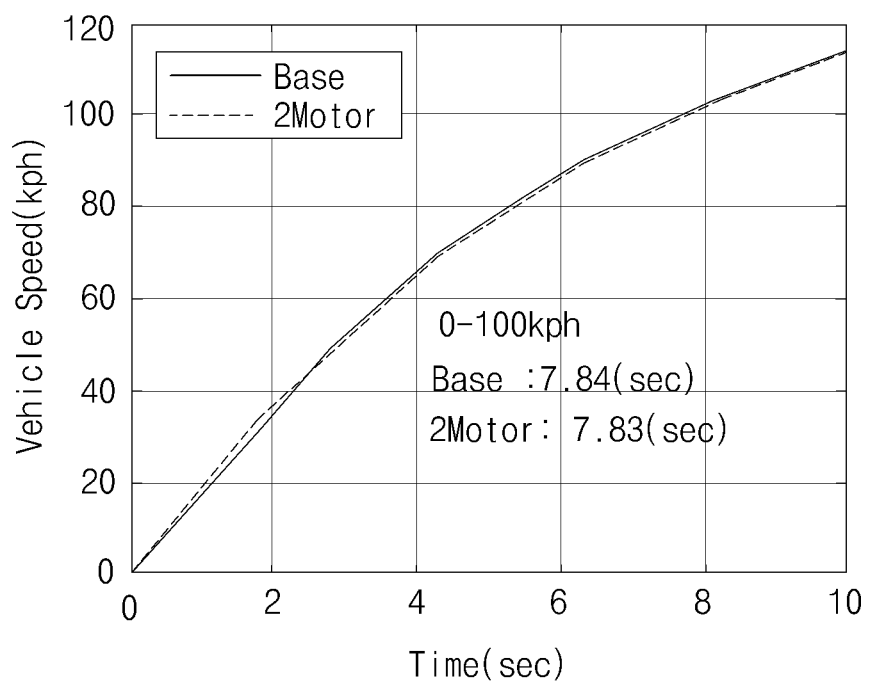

FIG. 14 is a graph that depicts the speed of the vehicle according to time in the wide open throttle state. That is, FIG. 14 is a graph for comparing zero-100 performances in a change from the first EV mode to the series mode and a change from the second EV mode to the series mode.

Referring to FIG. 14, it may be seen that the zero-100 in a first EV mode operation state and the zero-100 in a second EV mode operation state are of the same level.

Figure 15:
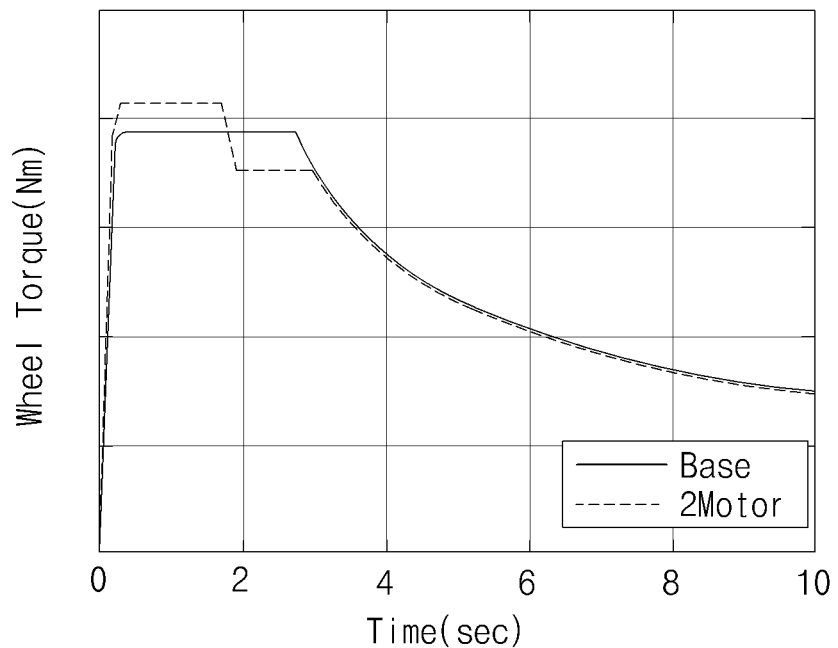
Figure 16:
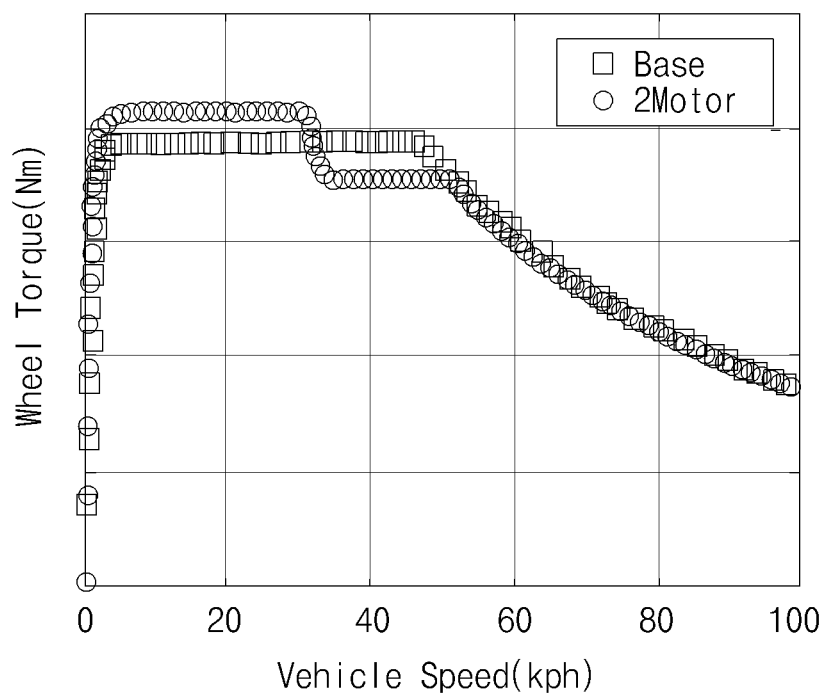

FIG. 15 is a graph depicting a change in the wheel torque according to time, and FIG. 16 is a graph depicting the wheel torque according to the speed of the vehicle.

Referring to FIGS. 15 and 16, it may be seen that changes in the wheel torques in the first graph (Base) and the second graph (2Motor) are different.

Figure 17:
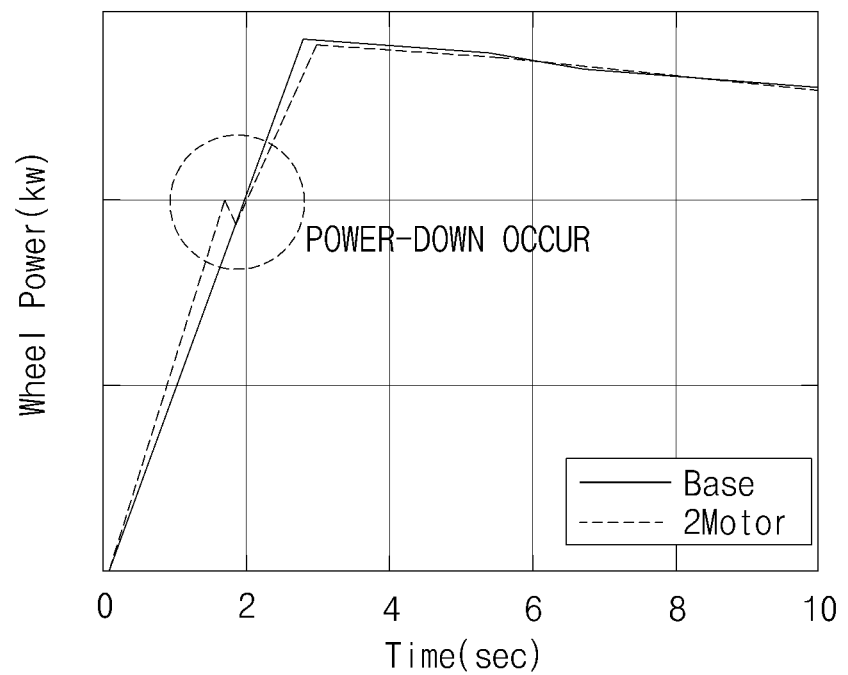

FIG. 17 is a graph that depicting a wheel power according to time.

Referring to FIG. 17, it may be seen that a section, in which a decrease in the wheel power abruptly occurs according to a change in time is generated when the reference speed is relatively high. That is, when the reference speed is set to be high, the power-down of the wheel power may occur. Accordingly, the reference speed may be set in consideration of a magnitude of the power-down of the wheel power.

Figure 18:
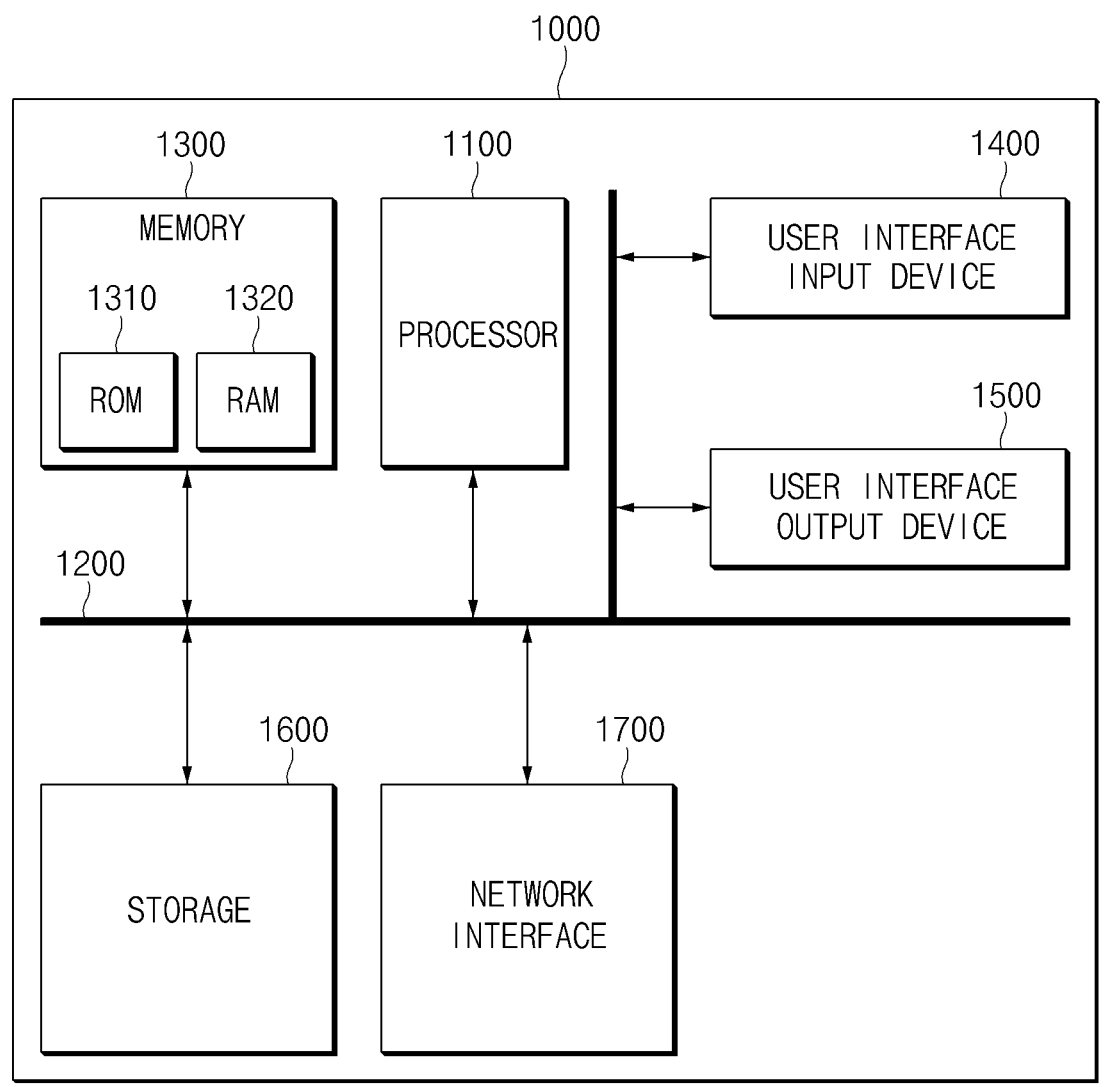
FIG. 18 is a view illustrating a computing system according to an exemplary embodiment of the present disclosure.

FIG. 18 illustrates a computing system according to an exemplary embodiment of the present disclosure.

Referring to FIG. 18, a computing system 1000 may comprise at least one processor 1100 a memory 1300, a user interface input device 1400, a user interface output device 1500, a storage 1600, and a network interface 1700, which are connected through a bus 1200.

The processor 1100 may be a central processing unit (CPU) or a semiconductor device that processes instructions stored in the memory 1300 and/or the storage 1600, and may comprise a configuration of the controller 93 according to the embodiment of the present disclosure. The memory 1300 and the storage 1600 may comprise various volatile or nonvolatile storage media. For example, the memory 1300 may comprise a read only memory (ROM) 1310 and a random access memory (RAM) 1320.

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a detachable disk, or a CD-ROM.

The exemplary storage medium is coupled to the processor 1100, and the processor 1100 may be configured to read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an exemplary embodiment of the present disclosure, a torque specification of a motor-generator may be reduced while maintaining a zero-100 performance.

According to an exemplary embodiment of the present disclosure, a size of a system may be decreased and a vehicle package may be easily designed by reducing a torque specification of a motor-generator.

In addition, the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A hybrid electric vehicle, comprising:
   an engine configured to generate power by burning a fuel;
   first and second motor-generators configured to:
      generate power; or
      assist the engine; and
   a controller configured to:
      set an operation of a first EV mode using:
         the second motor-generator;
         a second EV mode using the first and second motor-generators; or
         a series mode of driving the second motor-generator by using power generation of the engine, compare a speed of a vehicle with a reference speed when the engine is in an off state, and perform a control configured to cause the vehicle to drive in the second EV mode when the speed of the vehicle is less than the reference speed;

wherein the reference speed is set such that a 0-100 performance in the first EV mode and a 0-100 performance in the second EV mode are the same;

wherein the reference speed is set based on:
 a first vehicle speed-wheel torque graph in a process of converting the first EV mode to the series mode, and
 a second vehicle speed-wheel torque graph in a process of converting the second EV mode to the series mode, and
 the reference speed is set such a wheel torque area of the second vehicle speed-wheel torque graph, which is increased as compared with the first vehicle speed-wheel torque graph during a period in which the vehicle drives at a speed before the reference speed, and a wheel-torque area of second vehicle speed-wheel torque graph, which is decreased as compared with the first vehicle speed-wheel torque graph during a specific period, in which the vehicle drives at more than the reference speed, are the same.

2. The hybrid electric vehicle of claim 1, wherein:
a magnitude of a wheel torque in the second EV mode is set such that the wheel torque area of the second vehicle speed-wheel torque graph, which is increased as compared with the first vehicle speed-wheel torque graph during a period in which the vehicle drives at a speed before the reference speed, and the wheel-torque area of the second vehicle speed-wheel torque graph, which is decreased as compared with the first vehicle speed-wheel torque graph during a specific period, in which the vehicle drives at more than the reference speed, are the same.

3. The hybrid electric vehicle of claim 1, wherein outputs of wheel torque decreasing area in the series mode are the same in the first vehicle speed-wheel torque graph and the second vehicle speed-wheel torque graph.

4. The hybrid electric vehicle of claim 1, wherein the reference speed is set such that a power-down of wheel power is within a preset threshold electric power.

5. The hybrid electric vehicle of claim 1, wherein the controller is configured to identify a request for a wide open throttle (WOT) state when an accelerator pedal signal of the vehicle is greater than or equal to a threshold value while driving in the second EV mode.

6. The hybrid electric vehicle of claim 5, wherein the controller is configured to:
determine whether the engine is in the off state again in response to the request for the WOT state; and
select the series mode when the engine of the vehicle is in an on state.

7. The hybrid electric vehicle of claim 6, wherein the controller is configured to switch on the engine when the speed of the vehicle is greater than or equal to the reference speed while the engine of the vehicle is in the off state.

8. The hybrid electric vehicle of claim 7, wherein the controller is configured to set an operation in the series mode after the engine is switched on.

9. The hybrid electric vehicle of claim 5, wherein the controller is configured to maintain a driving mode, in which the vehicle is driving, when the accelerator pedal signal of the vehicle is less than the threshold value.

10. A method for controlling a hybrid electric vehicle, comprising:
determining, by a controller, whether an engine of a vehicle is in an off state,
 wherein the vehicle comprises:
  an engine; and
  first and second motor-generators,
   wherein a power transmission device is configured to be controlled in:
    a first EV mode using the second motor-generator;
    a second EV mode using the first and second motor-generators; or
    a series mode of driving the second motor-generator by using power generation of the engine;
comparing, by the controller, a speed of the vehicle with a reference speed, when the engine of the vehicle is in the off state; and
selecting, by the controller, the second EV mode when the speed of the vehicle is less than the reference speed;
wherein the reference speed is set such that a 0-100 performance in the first EV mode and a zero-100 performance in the second EV mode are the same;
wherein the reference speed is set based on:
 a first vehicle speed-wheel torque graph in a process of converting the first EV mode to the series mode, and
 a second vehicle speed-wheel torque graph in a process of converting the second EV mode to the series mode, and
the reference speed is set such that a wheel torque area of the second vehicle speed-wheel torque graph, which is increased as compared with the first vehicle s d wheel torque graph during a period in which the vehicle drives at a speed before the reference speed, and a wheel-torque area of the second vehicle speed-wheel torque graph, which is decreased as compared with the first vehicle speed-wheel torque graph during a specific period in which the vehicle drives at more than the reference speed, are the same.

11. The method of claim 10, wherein:
a magnitude of a wheel torque in the second EV mode is set such that the wheel torque area of the second vehicle speed-wheel torque graph, which is increased as compared with the first vehicle speed-wheel torque graph during a period in which the vehicle drives at a speed before the reference speed, and the wheel-torque area of the second vehicle speed-wheel torque graph, which is decreased as compared with the first vehicle speed-wheel torque graph during a specific period, in which the vehicle drives at more than the reference speed are the same.

12. The method of claim 10, wherein outputs of wheel torque decreasing area in the series mode are the same in the first vehicle speed-wheel torque graph and the second vehicle speed-wheel torque graph.

13. The method of claim 10, wherein the reference speed is set such that a power-down of wheel power is within a preset threshold electric power.

14. The method of claim 10, further comprising:
after performing a control such that the vehicle drives in the second EV mode, identifying a request for a wide open throttle (WOT) state when an accelerator pedal signal of the vehicle is greater than or equal to a threshold value, by the controller.

15. The method of claim 14, further comprising:
    determining, by the controller, whether the engine is an off state in response to the request for the wide open throttle state, by the controller; and
    selecting, by the controller, the series mode when the engine of the vehicle is in an on state.

16. The method of claim 15, further comprising switching on the engine, by the controller, when the speed of the vehicle is greater than or equal to the reference speed while the engine of the vehicle is in the off state.

17. The method of claim 16, wherein the switching on the engine comprises setting a drive in the series mode.

18. The method of claim 14, further comprising maintaining, by the controller, a driving mode, in which the vehicle is driving, when the accelerator pedal signal of the vehicle is less than the threshold value.

\* \* \* \* \*